Figure 1:
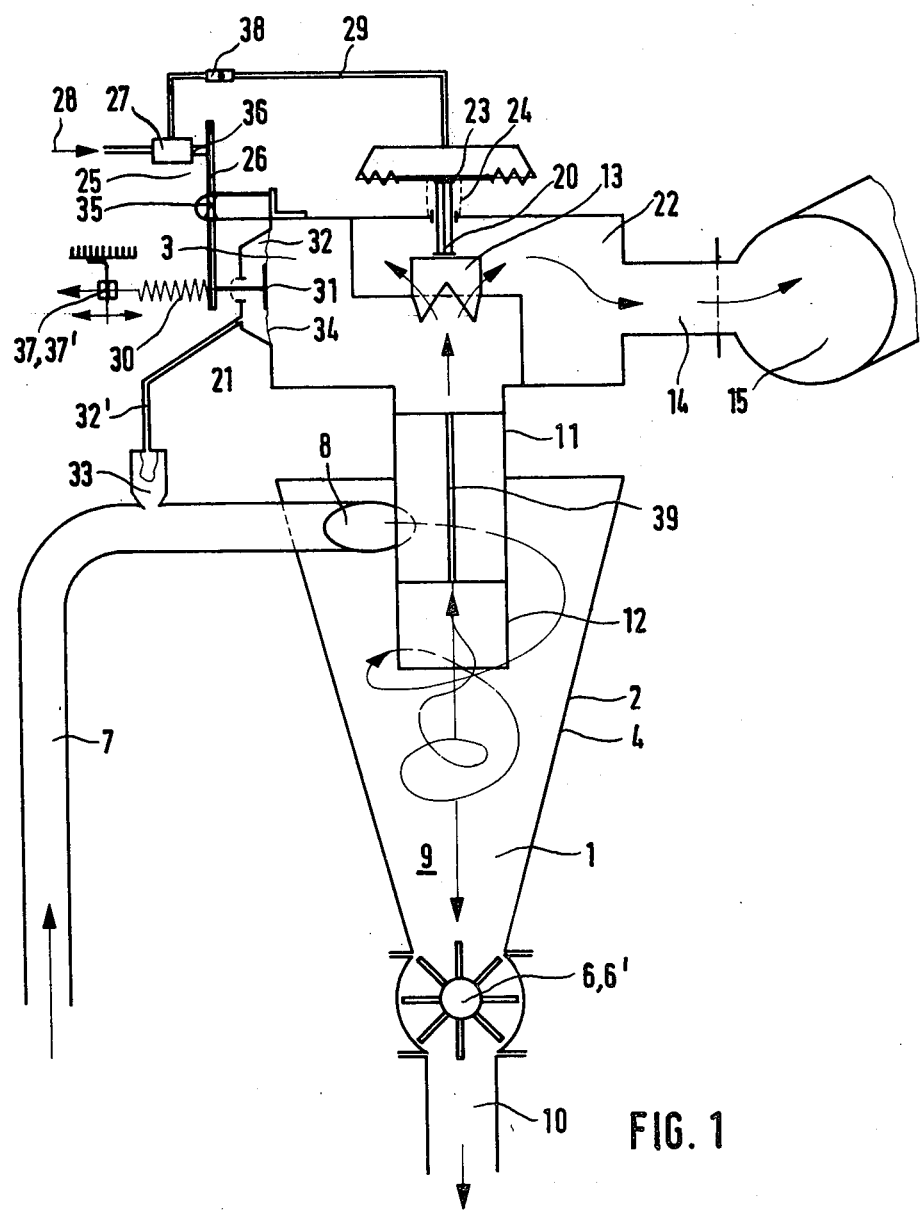

United States Patent [19]

Oetiker

[11] Patent Number: 4,473,326

[45] Date of Patent: Sep. 25, 1984

[54] METHOD OF CONTROLLING DELIVERY CONDITIONS IN A PNEUMATIC CONVEYOR LINE, AND MILL PNEUMATICS FOR IMPLEMENTING THIS METHOD

[75] Inventor: Hans Oetiker, St. Gall, Switzerland

[73] Assignee: Gebruder Buhler A.G., Switzerland

[21] Appl. No.: 321,177

[22] PCT Filed: Dec. 5, 1980

[86] PCT No.: PCT/CH80/00149

§ 371 Date: Nov. 5, 1981

§ 102(e) Date: Nov. 5, 1981

[30] Foreign Application Priority Data

Mar. 19, 1980 [CH] Switzerland ............... 2146/80
Jun. 30, 1980 [DE] Fed. Rep. of Germany ....... 3024743

[51] Int. Cl.³ ............................................ B65G 53/66
[52] U.S. Cl. ......................................... 406/14; 55/210; 55/417; 406/173
[58] Field of Search ............ 406/14, 168, 173, 171, 406/172, 169; 55/210, 417, 416

[56] References Cited

U.S. PATENT DOCUMENTS

| | | | |
|---|---|---|---|
| 1,432,111 | 10/1922 | Lewis | 55/417 X |
| 2,724,619 | 11/1955 | Berg | 406/14 |
| 2,826,459 | 3/1958 | Oetiker | 406/14 |
| 2,936,043 | 5/1960 | Armstrong et al. | 55/416 |
| 3,568,847 | 3/1971 | Carr | 55/417 X |
| 3,791,413 | 2/1974 | Muller et al. | 137/625.3 |
| 4,200,415 | 4/1980 | Boring | 406/173 |

FOREIGN PATENT DOCUMENTS

| | | |
|---|---|---|
| 811578 | 6/1951 | Fed. Rep. of Germany . |
| 1556111 | 3/1970 | Fed. Rep. of Germany . |
| 290764 | 5/1953 | Switzerland . |

*Primary Examiner*—Jeffrey V. Nase
*Attorney, Agent, or Firm*—Darby & Darby

[57] ABSTRACT

The invention concerns a process and a device for optimizing delivery conditions, specifically in a mill suction pneumatic system in which, as a rule, a large number of conveyor lines are connected to a common manifold or to a fan. Cyclone separators are employed for each individual conveyor line, and the air pressure across the cyclone is regulated to an essentially constant value through automatic adjustment of a slide valve after the cyclone. The opening movement of the slide valve is preferably effected more rapidly than the closing movement.

This regulation avoids instabilities in the conveyance and increases its operational safety and economic efficiency.

8 Claims, 5 Drawing Figures

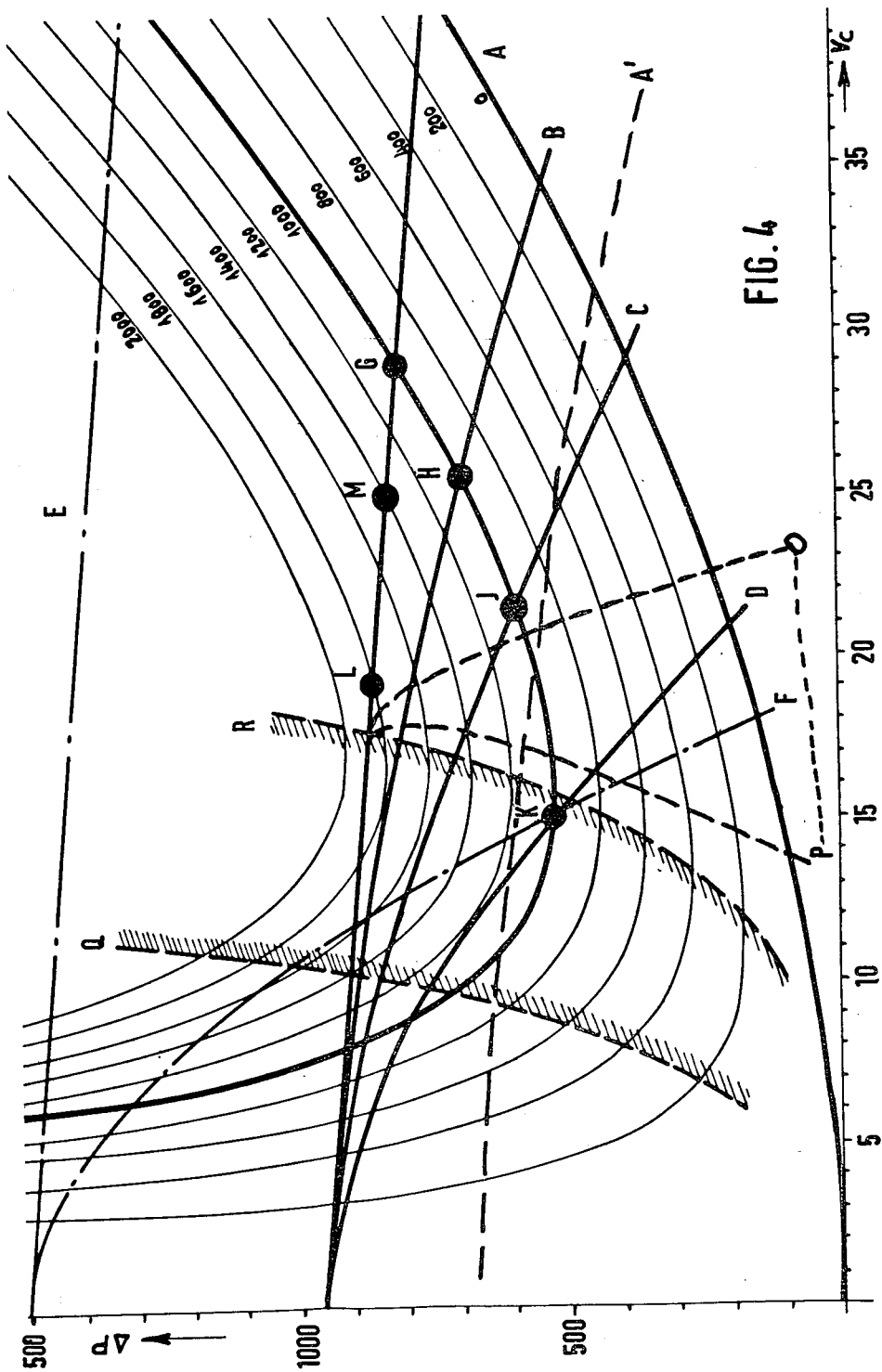

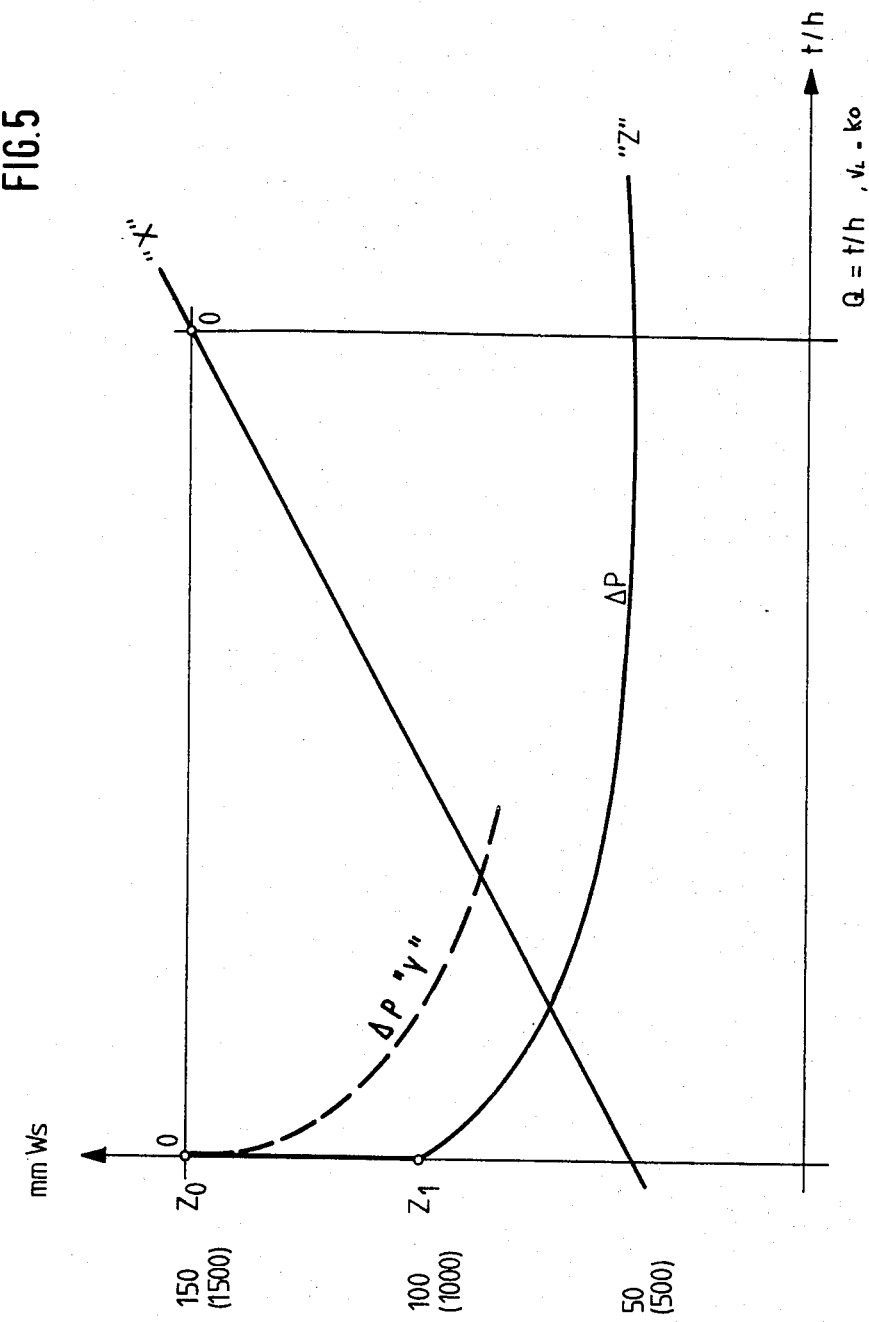

METHOD OF CONTROLLING DELIVERY CONDITIONS IN A PNEUMATIC CONVEYOR LINE, AND MILL PNEUMATICS FOR IMPLEMENTING THIS METHOD

This invention concerns a method of controlling the delivery conditions in a pneumatic conveyor line with an air impeller, in particular, one whose entire air conveyance system has a flat pressure/volume characteristic curve. The invention also concerns a mill pneumatic system with a regulating device, a product conveyor line, a separator, and an air impeller, for implementing such a method.

In the past three decades, mill pneumatics have nearly completely replaced the elevators previously employed for the passage lifting of intermediate milling products. Only by means of mill pneumatics can a large number of individual conveyors be installed in a manner that is particularly space-saving and adaptable to specific spatial conditions. A particularly great advantage of milling pneumatics is their relatively favorable construction cost and, also, the ease with which routes can be selected using tube switching points, rotary dispensers, etc.; they have other advantages as well, relative to other transport systems such as conveyor belts, bucket elevators, etc., despite their relativelylarge power requirements.

Many proposals have been made in the past for improving the economy of pneumatic conveyor systems, with equal or even better operating safety. In particular, in recent times the attempt has been made to obtain a so-called "dense flow conveyor", with particularly low air velocities and substantially increased product loadings. Substantial energy savings may, indeed, be achieved with the dense flow conveyor systems (such as, for example, timed pulse or stopper conveyors); however, due to their considerably greater construction costs, as well as pressures which are unusually high for mills, these systems have not gained firm acceptance into mill pneumatics, since they can only be introduced for single-line conveyance.

Now as before, mill pneumatics are usually constructed as fan pneumatics, and radial fans are generally used; axial or special blowers are employed only infrequently. For large conveyor lines and great distances, rotary reciprocating blowing engines aand, in isolated cases, screw compressors are also used.

As a rule, in mill pneumatics a number of conveyor tubes are attached to a common manifold, which is connected to the air impeller or the suction fan. Because of the large number of connections and the resulting pressure losses, an average static pressure is established that is less strongly influenced by individual passages, and adjustment of the volume of air is therefore problematic. The conveyor output of such mill pneumatics is subject to severe fluctuation, and, particularly under starting conditions, this can result in the fact that no product at all is conveyed in some of the lines.

In Swiss Pat. No. 290 764 the proposal is made for using at least two pneumatic conveyor lines, each of which is connected by way of a cleaning device to a common manifold, and each of which should have a regulating device, each of which, for its own part, controls an air volume adjusting butterfly valve. The control device should be installed between the cleaning device and the manifold, and the air volume-regulating butterfly valve, ahead of the cleaning device. The control device has the function of detecting flow fluctuations and varying the cross section of the aperture in the transport line by means of the air volume regulating valve, in order to thereby automatically ensure that the air volumes are balanced in the various transport lines. However, it has been shown that the solution proposed in Swiss Pat. No. 290 764 is not realizable, since the conveyor line cross sections employed must contain as few obstacles as possible, turns must be gentle, and tube switch points must require no sharp diversions. As a result of the additional risk of blockage due to product accumulation at the regulating valve and severe wear, this above-mentioned solution must be rejected because of practical considerations. With centrifugal force separators, which are most frequently used in mill pneumatics, the air/product mixture must also not become turbulent prior to its entry into the separator, since this has a detrimental effect on the product separation process. The air volume regulating device mentioned above from Swiss Pat. No. 290 764 also entails substantial construction expense, which applies particularly to its metrological aspect, if sufficient control precision and operating safety are assumed. This is all the more true if 20, 30 or more suitable cleaners must be employed in a mill pneumatic system; as a result, the already high costs for air cleaning would have to be more than doubled due to the additional automatic controllers. Since mill pneumatics have never been established as explosion sources with regard to dust explosions, recent efforts to replace such mill pneumatics again with mechanical conveyors for energy reasons alone are meeting with hardly any success.

A solution that is satisfactory in this respect to the problem of controlling the delivery conditions in a pneumatic conveyor line for mills could unfortunately not be found until now. Even such solutions as those described, e.g., in German Disclosure No. 15 56 111 were not able to gain significant acceptance into practice; there the proposal is made that the air velocity be controlled in a manner dependent upon the air pressure in the conveyor line.

At present, tendencies may be observed to solve the problem of mill pneumatics in such a manner that control is not applied; rather, only warnings are given and alarms set off before a breakdown occurs. A series of warning or alarm devices does not solve the technical problems, however; it only circumvents it.

Starting from this point, the invention was based on the task of further developing a method and mill pneumatics of the above-mentioned type such that the disadvantages of known solutions are largely eliminated, and, in particular, improvements in its economy and operating safety are achieved while incurring unusually small construction expenses, and yet the flexibility of the pneumatic conveyor system can be fully preserved. According to the invention this is achieved with a method of the type mentioned above by the fact that the pressure difference between inlet and outlet of a centrifugal force separator in the conveyor line is measured, and an air valve in the exit air duct of the centrifugal force separator is controlled automatically for the purpose of maintaining a desired value for this pressure difference.

Early attempts to employ the invention method produced surprisingly positive results: the pneumatic conveyor could be made more quiet relative to conventional mill pneumatics, and the total power requirements reduced by more than twenty percent.With the centrifugal force separator used in accordance with the invention, the system shows a regulating tendency similar to that obtained by automatically controlling air pressure losses. The invention permitted genuine improvement to be obtained in the functioning of the mill pneumatics by using surprisingly simple and robust devices that are in accordance with the system, and very simple constructional efforts. The mere pressure loss control is cost-favorable and economic in operation in comparison to regulating the product quantity, regulating the air volume, or even regulating the secondary air. A driven pneumatic system in accordance with the method in the invention has a tendency to maintain an optimal conveyor state, which is very important, particularly in the case of mill pneumatics, where a system usually has many parallel-connected, variable transport systems.

An advantageous development of the invention method is that the opening movement of the air valve is effected rapidly; the air valve is opened preferably from an intermediate position to its fully open position within several seconds—again preferably, within less than five seconds.

Furthermore, it is also advantageous if the pressure difference is measured at measuring points at a distance before and after the centrifugal force separator and adjusted to a predetermined value by automatically controlling the air valve. It is likewise advantageous if the pressure difference is adjusted to a constant value or to a higher value with increasing product output.

When the invention method is employed, the central elements of the mill pneumatics, such as the manifold, the central fan filter, etc., can be effectively dimensioned for the desired operating conditions, and the total output of the entire mill fluctuates only slightly in practice.

If it is necessary to provide several centrifugal force separators in the conveyor line, it is advisable to connect the exit air ducts of the centrifugal force separators to a common manifold or to a common air impeller, adjustment of the pressure difference occurring independently at each centrifugal force separator. It is possible in this manner, despite periodic and constant fluctuations in its individual passages, to limit the output of the entire mill to only slight fluctuation, since mutual balancing of fluctuations is possible, i.e., a conveyor line that shows a temporary output peak can also make use of more fan output without thereby significantly affecting the remaining lines.

The invention can be employed with particular advantage if the air impeller is connected to the downstream side of the centrifugal force separator, or if the pneumatic conveyor is operated in the suction mode.

The mill pneumatics of the invention are based on mill pneumatics of the type cited at the beginning, which are distinguished by the fact that they are provided with a separator designed as a cyclone, with a pressure difference measuring device and with an air valve controllable by the pressure difference measuring device. Using the mill pneumatics of the invention, the invention method may be implemented in a particularly advantageous manner and its advantages put into practice. At the same time, only relatively small construction efforts are required in comparison to the expensiveness of the above-mentioned air volume measuring devices, which require turbulence-free tube sections before and after the measuring device as well as dust-free air. Likewise, the complex conversion mechanisms and conversion of partly mechanical, electrical, or pneumatic signals required with many of the above-mentioned measuring devices are completely avoided. From the point of view of avoiding the danger of explosion that arises in dust-laden air, the mill pneumatics of the invention are particularly favorable.

It is advantageous for the exit air duct of the cyclone to be designed as an immersion tube and the air valve to be assigned directly to the latter; in turn, the air valve is preferably mounted on the immersion tube.

Especially favorable results may be achieved if, in a mill pneumatic system according to the invention, a first pressure measuring point is located on the conveyor line at a distance ahead of the entry of the latter into the cyclone, and a point at a distance after the separator is used as the second measuring point; and extraordinarily advantageous results can be achieved if the measuring point ahead of the entry of the conveyor line into the cyclone is attached ca. 0.5 meters to 1.5 meters before the entrance. In this manner the distinctive effect of the cyclone may be taken optimally into account, and any possible tendency toward overcontrolling can be avoided from the very beginning.

Moreover, it is advantageous if one pressure measuring point is located ahead of the entrance to the cyclone and another measuring point, immediately ahead of the air valve.

Particularly good results with respect to both overall regulation and power requirement may be achieved if the separator is designed as a cyclone with a shape tapering conically from top to bottom. At the same time, a particularly favorable relation may be obtained here between energy recovery and product turbulence. An especially advantageous separator effect may be obtained if the air valve is located in a straight extension of the separator outlet and has several adjustable and symetrically positioned air passage holes.

In a particularly practical realization, the air valve is designed as a box with two chambers lying partially atop one another; the lower chamber is connected directly to the air outlet of the cyclone, and the upper chamber is coupled by means of a connecting duct to the air impeller, and the two chambers are connected to each other through the adjustable air valve. It has been shown to be particularly advantageous with respect to their spatial relations if the exit air duct of the separator leads vertically into the lower chamber and the connecting duct is coupled horizontally to the upper chamber; the connecting duct may be connected anywhere desired in a horizontal plane.

The invention mill pneumatics are suited in a particularly advantageous way to regulation by means of pneumatic control elements, in particular, to a force membrane for automatically controlling the air valve.

Also, it is very advantageous if a pressure measuring point is connected by a sealed membrane directly to the outlet of the separator—preferably, directly to the lower chamber itself.

It has also proven to be particularly advantageous to place longitudinal ribs in the exit air duct of the cyclone, for partially or completely suppressing turbulence in the exit air duct.

Figure 2:
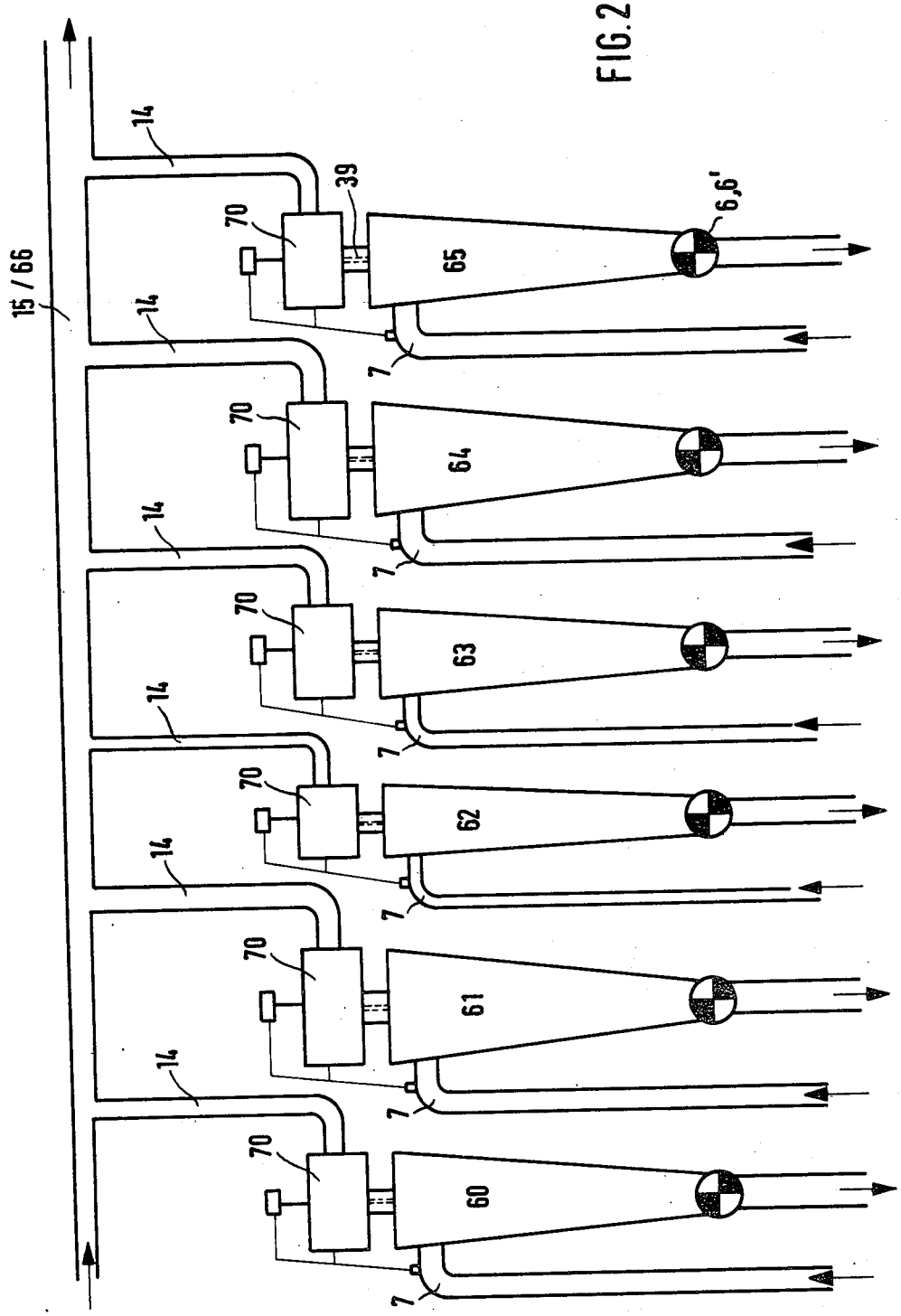
Figure 3:
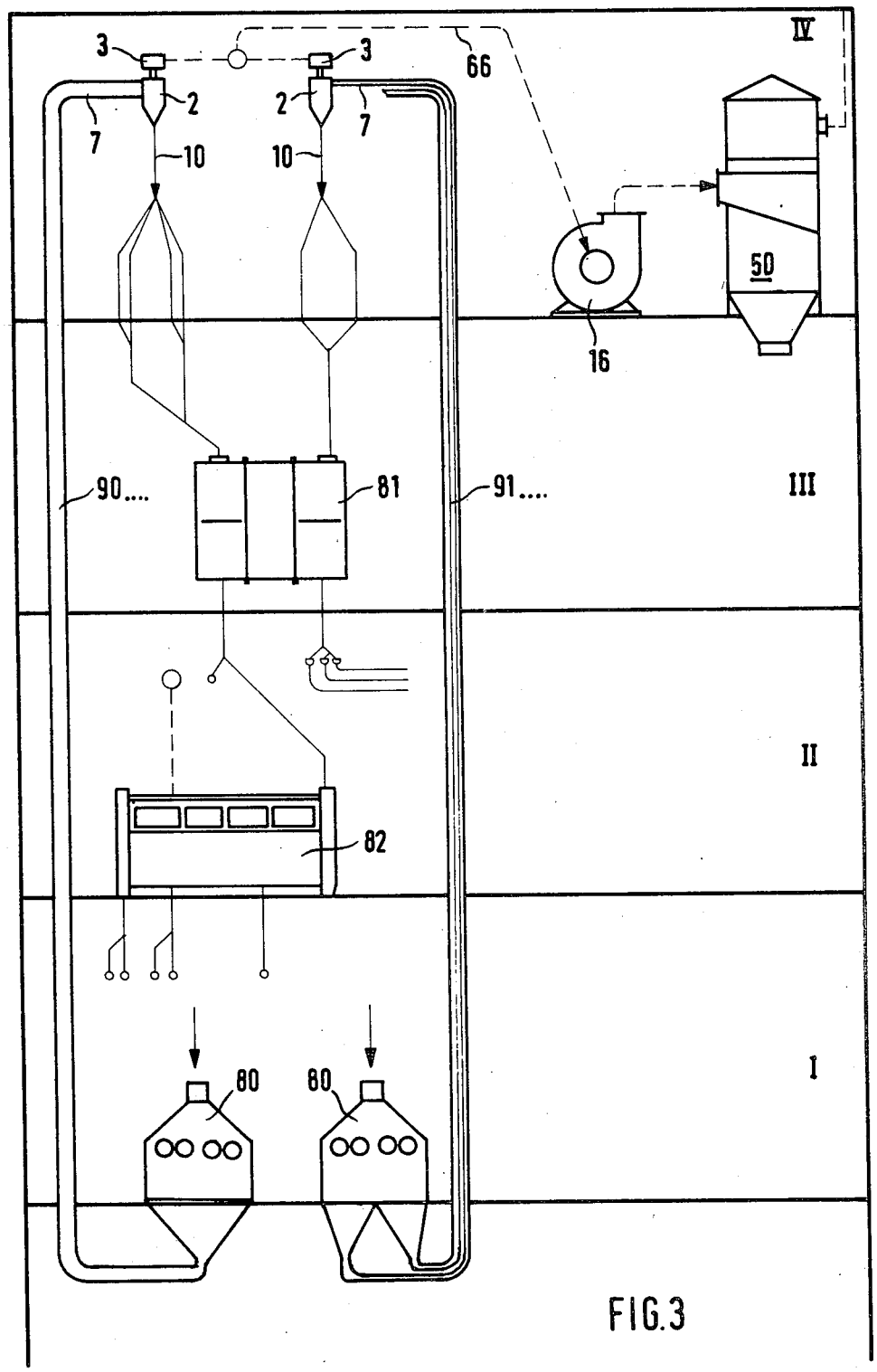

The invention is explained in principal in further detail in what follows, by way of example, with the help of the illustration. It shows:

FIG. 1: an execution example for a device according to the invention (in principle);

FIG. 2: simultaneous use of a number of individual regulating units which are connected to a common air source;

FIG. 3: a schematic overall representation of a mill pneumatic system according to the invention;

FIG. 4: a diagrammatic representation of the pressure/velocity relations in a pneumatic conveyor;

FIG. 5: the pressure loss/product output relation in a cyclone and in the conveyor line.

In the mill pneumatics represented in FIG. 1, the separator 1, which is designed as a cyclone 2, has a regulating device 3. The cyclone 2 exhibits a cone 4, tapering uniformly from top to bottom, which is closed to the outside on top with a cover 5 and on the bottom with a product gate 6 and a rotary gate 6'. A pneumatic conveyor line 7 leads for the most part horizontally and tangentially to the opening 8 into the separator chamber 9. The product separated in the cyclone 2 falls into the product gate 6 and is returned by means of a gravity tube 10 to the processing sequence, as may be seen from FIG. 3.

The exit air duct 11 leads by way of an immersion tube 12 into the separator chamber 9 and is connected by an air valve 13 of a connecting duct 14 to a manifold 15 and to a fan 16 (illustrated in FIG. 3).

The air valve 13 is formed by a valve slide 20 and a valve chamber, consisting of a lower chamber 21 and an upper chamber 22. The valve slide 20 is set into motion by a pressure-activated force membrane 23, and a compression spring 24 pushes the valve slide 20 into its fully open position when pressure is absent on its regulating side. The force membrane 23 is controlled by a simple compressed air control unit 25, which consists of the following elements: a regulating arm 26, a three-way valve 27, a compressed air supply line 28, a regulating line 29, an adjusting spring 30, and a pressure comparison measuring point 31. The pressure comparison measuring point 31 has a closed regulating chamber 32 which is connected by means of an air line 32' to a pressure measuring point 33 in the conveyor line 7, which transmits the static pressure in the conveyor line 7. The other side of the pressure comparison measuring point 31 is connected through a sealed membrane 34 directly to the lower chamber 21. The pressure comparison measuring point therefore compares the pressure at the point after the cyclone separator to that at the point 0.5 to 1.5 meters ahead of the cyclone, i.e., displaced in the direction opposite to that of conveyance. The pressure difference on both sides of the sealed membrane 34 moves the regulating arm 26 about a joint 35.

The method of operation of the regulating device shown is as follows:

(a) with conveyor air shut off:

at the pressure comparison measuring point, the same static pressure act upon both sides, so that no force is applied to the regulating arm 26 except that of the adjusting spring 30, which pulls the adjusting arm in a clockwise direction and by means of the regulating arm 26 opens a switch contact 36 of the three-way valve 27. With the three-way valve 27 open, the connection from the air supply line 28 to the regulating line 29 is interrupted, so that there is no regulating pressure in the regulating line 29 or behind the force membrane 23, and the compression spring 24 holds the valve slide 20 in its fully open position. The fan 15 can in this manner never be turned on when the valve slides 20 are completely closed.

(b) with conveyor air turned on, but without product conveyance:

for clarification of this condition, the reader is referred to FIG. 5, which illustrates schematically the resistance behavior of the cyclone 2. The measured pressure difference is expressed vertically in mm $H_2O$, and conveyor output is expressed horizontally in t/h. A curve "X" shows the pressure loss in the conveyor line. The pressure loss is approximately linearly proportional to the conveyor output, and the lowest value corresponds to the idling resistance. The pressure values given in parentheses are applicable to the pressure values in this curve. (The pressure values without parentheses apply to the other curves.)

Product turbulence in the cyclone 2 is responsible for a pressure "jump" effect in the cyclone: when the pneumatic conveyor line is blown clear after product has been conveyed, in many cases stable product turbulence remains in the cyclone, which is responsible for the form of air turbulence in the exit air duct. The latter, on the other hand, gives to the cyclone part of its characteristic air volume/pressure curve. If the turbulence in the exit air duct is fully suppressed, the resistance behavior of the cyclone is influenced accordingly. It was possible to show that even minimal product residues produce the typical cyclone effect or the corresponding turbulence sink. The product residue mentioned could be residual dust whirled up in the system, etc. When a perfectly clean pneumatic line is put into operation, the turbulence sink must first form. Under ideal conditions, as product output rises a pressure curve "Y" would then result. In practice, however, it has not yet been possible to determine a curve "Y" with sufficient reproducibility. On the other hand, today it is easy to bring about the above-mentioned pressure jump artificially, by throwing in a handful of flour or grit. The cyclone resistance then falls from a value $Z_0$ to a value $Z_1$ and remains at the latter value in the absence of product conveyance. If more product is conveyed or product conveyance is increased, a pressure course corresponding to curve Z is obtained. When the conveyor air is turned on but no product is being conveyed, the idling resistance appears in the conveyor line 7 at maximum air velocity. According to the representation of FIG. 4, a system characteristic curve A, for example, produces an air velocity of over 40 m/s. Depending on the air volume, the pressure loss in the cyclone 2 also reaches a maximum, e.g., corresponding to point $Z_1$ or point $Z_2$. Therefore, in mill pneumatics with several conveyor lines, the conveyor line under consideration here, by doubling its air volume, will produce a corresponding reduction in the air volume available for the remaining lines. In the invention, a large pressure surge in the cyclone results in the membrane 34 being pushed to the right and the switch contact 36 being closed by the regulating arm 26. From the compressed air supplyline through the control line 29, pressure is built up behind the force membrane 23 which presses the air valve 13 downward into its closed position. The volume of air flowing through the cyclone 2 is reduced until balance is achieved among the individual control elements. The volume of air is adjusted not to a higher equilibrium value, but to a lower one corresponding to the related pressure difference in the cyclone 2. After each particular regulation adjustment, a point corresponding to the curve "O" will be produced.

(c) with product conveyance:

it may be seen from FIG. 4 that a conventional system reaches an equilibrium point, depending on its system characteristic curve, e.g., according to curve A, B, C or D. With small product loads corresponding to the equilibrium point, or the point of intersection of these curves, on one hand, and a corresponding product curve 0, 200, 400, 600, . . . , 2000, on the other, a substantial portion of the power requirement is wasted through unnecessarily high velocities in the conveyor line and other parts of the system. The highly loaded lines are weakened, and, especially, a central filtering system 50 is overloaded. According to the invention, a curve "O" . . . "P" may now be traced. With small product loads, the operating method is similar to the case without product conveyance described in par. (b) By selecting an appropriate adjusting spring 30 or compression spring 24, a predetermined correction can be introduced into the regulation, i.e., the ratio of the static pressure forces and the spring forces may be influenced in a desired direction.

In FIG. 4 the area of optimal conveyor conditions for a suction pneumatic system is represented by hatching. This area is located between the curves Q and R, and to the left of curve Q begins the area of unstable conveyance, which must be avoided in practice. With known solutions, the overall pressure level of the pneumatic system is displaced downward by opening all the adjustment slides. In place of curve A is produced, e.g., a characteristic curve A'. Each individual conveyor line would be able (in the case of a conveyor output with a value over 1000) to occupy two possible equilibrium points—in the unstable area or in an area which would be quite close to the optimal conveyance area. In such a case, artificial blockages occur periodically as a result of variation in the conveyor conditions; this momentarily disrupts the conveyance. When this happens, all the product in vertical sections of the lines falls down, forming a product plug which, as a rule, may be eliminated only by disassembling the conveyor line.

The invention not only permits selection of the slope of the pressure/velocity curve. The curve may even exhibit a negative course, as shown in curve B. Furthermore, its exact position may be determined by shifting the equilibrium by means of nuts 37 and 37' within the area of optimal conveyance conditions or, as shown in FIG. 4, immediately adjacent to area Q . . . R. Since unforeseeable operating circumstances occur time and again in practice (sudden output peaks, electrical supply failures, etc.), the area between curves O and P is preferred.

By installing a universally acting valve 38, the movement of the air valve 13, particularly when opening, may be made very rapid, which is important. Care must be taken, in this connection, that the control line is exhausted rapidly but pressurized slowly. In order to avoid jeopardizing regulating stability, however, neither movement should be made more rapid than necessary, i.e., the closing movement of the air valve, in particular, should occur relatively slowly.

FIG. 2 shows schematically a large number of individual cyclones 60 to 65 which are connected to a common manifold 66. Each cyclone has a regulating device 70 in accordance with the invention, and all the regulating devices shown are preferably identically executed. In contrast to the regulating devices 70, however, each cyclone is appropriately proportioned for its specific product conveyance capacity.

Although certain regulating elements for the entire group could be readily combined in a central regulator, the best solution proved to be leaving each regulator cableof functioning autonomously. Each regulator is designed as a complete unit, and no reciprocal interference or other negative effects resulting from single regulators have been discovered.

As represented in FIG. 1 and FIG. 2, longitudinal ribs are preferably mounted in the exit air duct of each cyclone 2 in the form of a cross 39. This has no negative effect on the separating efficiency of the cyclone 2, but the turbulence effect is kept under control. In FIG. 3 is presented a schematic overall view of a mill arrangement of the conventional type. The mill building is constructed in several stories, which are designated as I, II, III and IV. Arranged one above the other are the floor for the roll frames 80 and those for the flat sifters 81 and the semolina cleaning machines; the bulk goods fall by gravity from top to bottom. Lifting of the product for its next processing stage is accomplished by the mill pneumatics, or the individual lines 90, 91, . . . ; more than twenty lines are routinely required, and in many cases, fifty and even more lines. The lines may be connected to one or more central cleaning units or filters 50. With the exception of the pressurized line, however, all the lines are preferably connected through cyclones or other centrifugal force separators to their respective central air system, and each line, in accordance with the invention, has its own regulating device. It is also obvious, however, that not all pneumatic lines must necessarily be equipped with regulating device as in the invention. But it is desirable for all lines to be regulated that are connected to a common manifold.

I claim:

1. In a pneumatic conveying system of the type including a separator, constructed as a cyclone, having an inlet connected to a conveyor line, an air outlet connected to an air collecting line and a product outlet; an air flow valve downstream of the air outlet of the cyclone; and control means pneumatically coupled to a first pressure measuring point on the conveyor line ahead of the cyclone inlet and to a second pressure measuring point downstream of said cyclone air outlet, said control means being responsive to the pressure difference between said first and second pressure measuring points to control said air flow valve, the improvement comprising:

immersion tube means connected at a first end to said air flow valve and projecting within said cyclone at a second end;

said air flow valve comprising an enclosure with partly superimposed upper and lower chambers separated by a wall, the lower chamber being directly connected to the immersion tube means and the upper chamber being connected to the air collecting line, a passageway in said wall providing communication between said upper and lower chambers, and movable throttle means interposed in said passageway for controlling air flow therethrough;

said control means including a control chamber coupled through a sealed membrane to the lower air flow valve chamber and pneumatically coupled directly to the first pressure measuring point, and a regulating valve having an inlet coupled to a source of compressed air, an outlet, and a regulating member mechanically coupled to said sealed membrane and being positionable to control the pneumatic coupling between said regulator valve inlet and outlet; and a pneumatically operated force member pneumatically coupled with said regulating valve outlet and mechanically coupled to move said throttle means to control the air flow in said passageway.

2. A system according to claim 1, wherein the air flow valve is positioned in line with said immersion tube means and has a plurality of tapered air openings in said flow valve.

3. A system according to claim 2, wherein the openings have a tapered cross-sectional shape when viewed generally perpendicularly to the adjustment direction of the throttle means.

4. A system according to claim 3, wherein the air opening cross sections have a triangular shape.

5. A system according to claim 1, characterized in that the immersion tube means is directed generally vertically into the lower chamber and the upper chamber is generally horizontally connected to the air collecting line.

6. A system according to claim 1, characterized in that the immersion tube means contains longitudinal ribs for suppression of turbulence, said system further comprising suction means connected downstream of the cyclone air outlet.

7. A system according to claim 1, wherein said regulating member comprises a pivotally mounted regulating arm coupled to be rotatable by said membrane and spring means for pre-tensioning said regulating arm.

8. Mill pneumatics in accordance with claim 1, wherein the first measuring point is located 0.5 to 1.5 meters ahead of the inlet of the cyclone.

* * * * *